United States Patent [19]

Kozuka et al.

[11] Patent Number: 5,845,119
[45] Date of Patent: Dec. 1, 1998

[54] SOFTWARE DEVELOPMENT TOOL FOR COMBINING SOFTWARE COMPONENTS/MODULES

[75] Inventors: Kiyoshi Kozuka, Yokohama; Takashi Ohkoda, Tama; Takahiro Seki; Etsuko Yamada, both of Yokohama; Kazuhiko Sakamoto, Kawasaki, all of Japan

[73] Assignee: Hitachi, Ltd., Tokyo, Japan

[21] Appl. No.: 744,457

[22] Filed: Nov. 7, 1996

[30] Foreign Application Priority Data

Nov. 8, 1995 [JP] Japan ................................. 7-289761

[51] Int. Cl.⁶ ....................................................... G06F 9/45
[52] U.S. Cl. ............................ 395/702; 395/701; 395/703; 395/709
[58] Field of Search ................................... 395/710, 701, 395/702, 703, 709

[56] References Cited

U.S. PATENT DOCUMENTS

| | | | |
|---|---|---|---|
| 5,159,687 | 10/1992 | Richburg et al. | 395/700 |
| 5,307,499 | 4/1994 | Yin . | |
| 5,315,710 | 5/1994 | Kishimoto et al. . | |
| 5,353,371 | 10/1994 | Honiden et al. | 395/1 |
| 5,381,548 | 1/1995 | Matsuo . | |
| 5,461,714 | 10/1995 | Honiden et al. | 395/267 |
| 5,522,079 | 5/1996 | Acker et al. | 395/700 |
| 5,551,030 | 8/1996 | Linden et al. | 395/600 |
| 5,572,733 | 11/1996 | Ryu et al. | 395/701 |
| 5,706,501 | 1/1998 | Horikiri et al. | 395/610 |
| 5,745,764 | 4/1998 | Leach et al. | 395/683 |
| 5,758,160 | 5/1998 | McInerney et al. | 395/701 |
| 5,764,226 | 6/1998 | Consolatti et al. | 345/333 |

OTHER PUBLICATIONS

Computer Magazine of IEEE Computer Society pp. 74–81 "Dynamic Linking of Software Components", Mar. 1997.
"ObjectReuser 1.0 User Guide", by Hitachi, Ltd., Jun. 1994.

Primary Examiner—James P. Trammell
Assistant Examiner—Todd Ingberg
Attorney, Agent, or Firm—Fay, Sharpe, Beall, Fagan, Minnich & McKee

[57] ABSTRACT

A functional relation between components which can be extracted from an already existing program in advance is automatically extracted by a computer, or such a functional relation which cannot be extracted is defined by a developer, so that the preparation of a program by combining the components is assisted. A dictionary registration unit reads a source code file, analyzes, extracts a component definition, and extracts from the component definition information a counterpart component name, interface name, and interface definition, and registers component name, counterpart component name, interface information of the interface name, and interface definition body in a dictionary. Furthermore, when there is no source codes, the developer inputs the interface information from an input-output device, and registers in the dictionary. A program editing processing unit, on the basis of a user's indication, retrieves and displays a list of interfaces between components, and also extracts the interface definition from the dictionary, thereby to assist the user in preparing a program by combining the components.

6 Claims, 12 Drawing Sheets

FIG.5A
CLASS DEFINITION OF COMPONENT "TABLE"

```
Class TABLE
CLASS VARIABLE DEFINITION
ATTRIBUTE DEFINITION
Method DISPLAY_TABLE
   :
   Display ( )
   :
End Method DISPLAY_TABLE
Method STORE_TABLE_IN_DB
   :
   Invoke DB UPDATE (TABLE DATA)
   :
End Method STORE_TABLE_IN_DB
Method DISPLAY_TABLE_IN_BAR_CHART
   :
   Invoke DISPLAY_IN_BAR_CHART (TABLE DATA)
   :
End method DISPLAY_TABLE_IN_BAR_CHART
Method DISPLAY_TABLE_IN_BROKEN_LINE_CHART
   :
   Invoke DISPLAY_BROKEN_LINE_CHART (TABLE DATA)
   :
End Method DISPLAY_BROKEN_LINE_CHART
End Class TABLE
```

FIG.5B
CLASS DEFINITION OF COMPONENT "DB"

```
Class DB
Method UPDATE (VARIABLE 1)
   :
   DB UPDATE PROCESSING
   :
End Method UPDATE
End Class DB
```

FIG.5C
CLASS DEFINITION OF COMPONENT "CHART"

```
Class CHART
COLOR ATTRIBUTE
AREA FILL ATTRIBUTE
Method BAR CHART DISPLAY (VARIABLE 2)
   :
   DISPLAY PROCESSING
   :
End Method BAR CHART DISPLAY
End Class BROKEN LINE CHART DISPLAY (VARIABLE 1)
   :
   DISPLAY PROCESSING
   :
End Method BROKEN LINE CHART DISPLAY
End Class CHART
```

5102 : COMP. NAME
5103 : VARIABLE DEFINITION
5104 : ATTRIBUTE DEFINITION
5106 : INTERFACE DEFINITION
5107 : INTERFACE NAME
5109 : CUNTERPART COMP. NAME

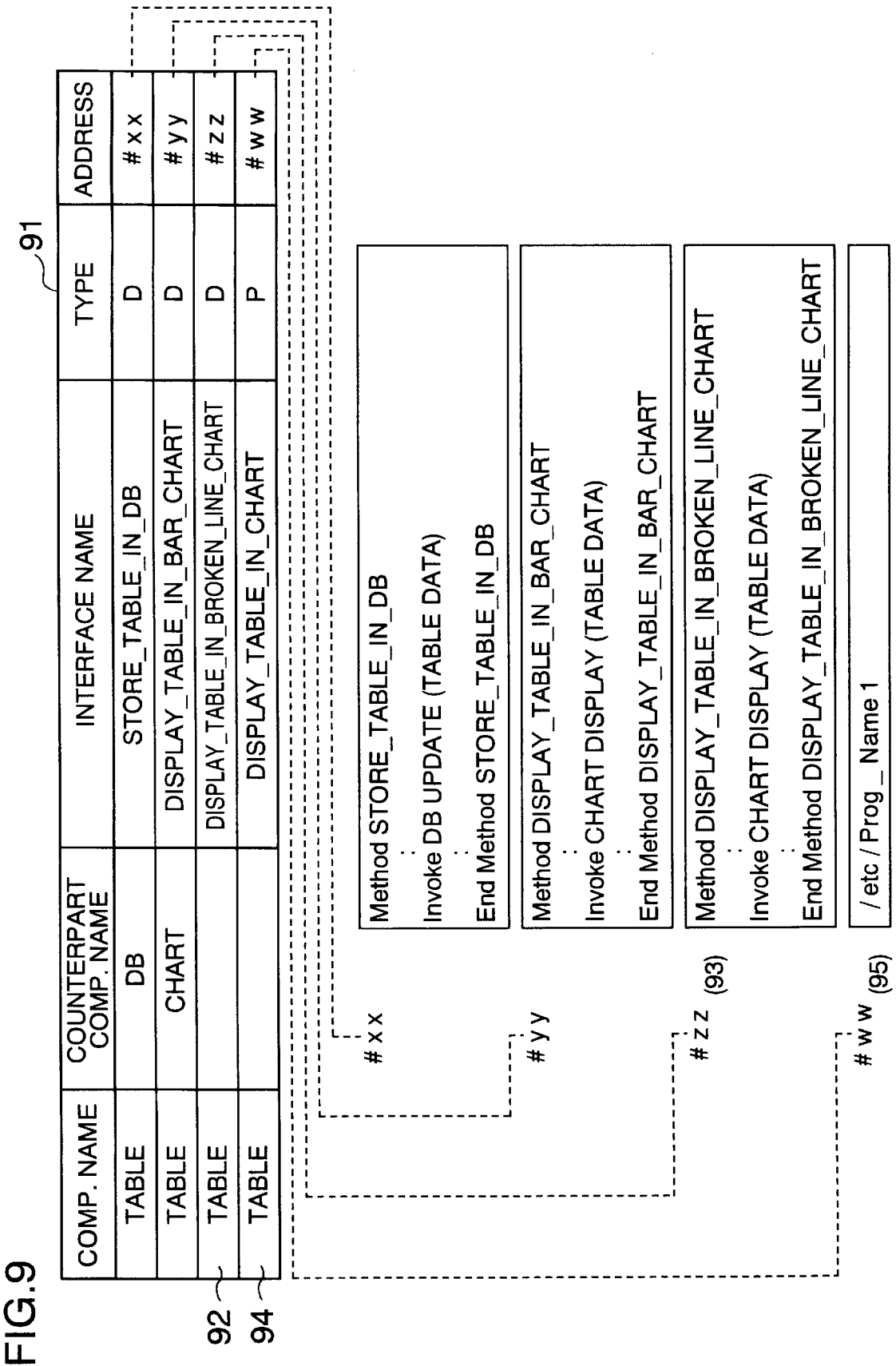

SOFTWARE DEVELOPMENT TOOL FOR COMBINING SOFTWARE COMPONENTS/MODULES

BACKGROUND OF THE INVENTION

The present invention relates to a method and apparatus for assisting program preparation which is performed on a computer by combining a plurality of program modules (components) already developed by a programmer, and in particular, to a method and apparatus for assisting programming by automatically extracting or defining an interface between components, and thereafter, by retrieving/combining the components by the programmer based on the result of the extraction or definition.

Conventionally, as a technique for assisting programming by making easy the component retrieval at the time of reuse of software modules (components), an ObjectReuser is known which is disclosed in a manual entitled "ObjectReuser Version 1.0 User Guide" issued by Hitachi, Ltd, in June 1994. In this ObjectReuser, all of the sorting of components corresponding to component definition extraction and the correlation between the components are performed by a user (programmer) on his/her own responsibility. Specifically, the user determines to which sort a component developed by the user is to be included, and the user inputs what function the component should have as a hypertext document. The user who reuses components searches for his desired component while retrieving on the basis of information of the hypertext document which has been inputted in advance. Furthermore, although a component developer inputs the relation between the components manually, only the presence or absence of the relation can be defined, and it is impossible to define the functional relation. Accordingly, the user ultimately determines the relation between the components by preparing a program.

Also, a UIBT (User Interface Building Tool) of Hitachi, Ltd, and a Visual Basic of Microsoft Corporation are systems for programming by assembling components. However, these systems merely provide a means for selecting a function of the component itself. In the case of the UIBT, a drawing design is performed by repeating selection of components (menu, label, circle, chart, etc.) provided by the UIBT from a component palette, thereafter, the attribute of the component itself is changed/adjusted, and ultimately the user describes actual logic in C language. Also the relation between the components is described by the programmer by using the C language or the like. Similarly, in the Visual Basic, the drawing design and the change of the drawing component attribute, and the description of the logic by the user in Basic language are performed.

In the prior art techniques mentioned above, in the case of describing the relation between the components, it was necessary for the user to program the functional relation by himself. All the programmings are formed on the single term (variable substitution, etc.) or the binary relation (binary operation, substitution of variables for each other or comparison of the variables, etc.). Thus assuming that the component itself is the single term, and the relation between the component and another component is the binary relation, in the programming by components, only the single term function is made the object in the retrieval function of the component, and in the taking out from the component palette and the changing of the attribute in the prior art techniques, and it cannot be said that the binary relation is taken into consideration.

SUMMARY OF THE INVENTION

It is an object of the present invention to provide a method and apparatus for assisting program preparation, which enable a programmer to prepare a program by easily combining components (program modules).

In the present invention, in preparing a program, when it is known that certain components are to be combined, if it is possible to extract in advance what functional relation is formed between the components, such a functional relation is automatically extracted by a computer. If it is impossible, a component developer defines in accordance with a guidance by the computer and a user prepares a program by combining the components. In this case, the present invention aims to eliminate the need for the user to describe the relation between the components.

In one aspect of the present invention, class definitions which express the components in object oriented language are automatically extracted from source codes of already existing programs by a computer, and dependence relation on another component are automatically extracted by the computer from a method (interface) definition within the class definition, and a component name, an interface name with a counterpart component, and an interface definition are held in a dictionary as interface information. In the case where the user prepares a more complete program by combining a certain component with another component, it is a characteristic feature of the present invention in which on the basis of the designation of components desired to be combined by the user, a list of interfaces between the components is retrieved from the dictionary and displayed, a specific interface is designated from the list in accordance with the indication of the user, an interface definition is extracted from the dictionary based on that interface, and the program is produced.

In another aspect of the present invention, it is a characteristic feature of the present invention in which in the case of adding an inter-component interface, or for components which are not programed in the object oriented language, the developer defines a component name, a counterpart component name, and an interface (interface name, interface definition) between components in the dictionary.

In still another aspect of the present invention, it is a characteristic feature of the present invention in which in the case of defining an interface between components, by designating a program name which produces that definition, source code of the interface definition are automatically produced.

The components are stipulated by the behaviors of the components. A typical example is a relation between a class of the object oriented language and a method. The interface between components is made up of an internal behavior between a component and another component, and a relation between the behavior and an external component, and the retrieval of the interface between components is made easy by automatically extracting the relation mentioned above from an already existing program, or by providing a mechanism for defining, and the programming can be assisted by producing a corresponding interface module.

In an embodiment of the present invention, when the user indicates a combination of components, there is displayed a list of interface information between components which information was extracted in advance or defined, and by selecting and indicating from the list by the user, the retrieval or production of a program which realizes the combination of the components becomes possible.

BRIEF DESCRIPTION OF THE DRAWINGS

FIGS. 5A, 5B, and 5C are diagrams showing examples of components in object oriented language.

FIG. 9 is a diagram showing an example of content of a dictionary of the present invention.

DESCRIPTION OF THE PREFERRED EMBODIMENT

Figure 1:
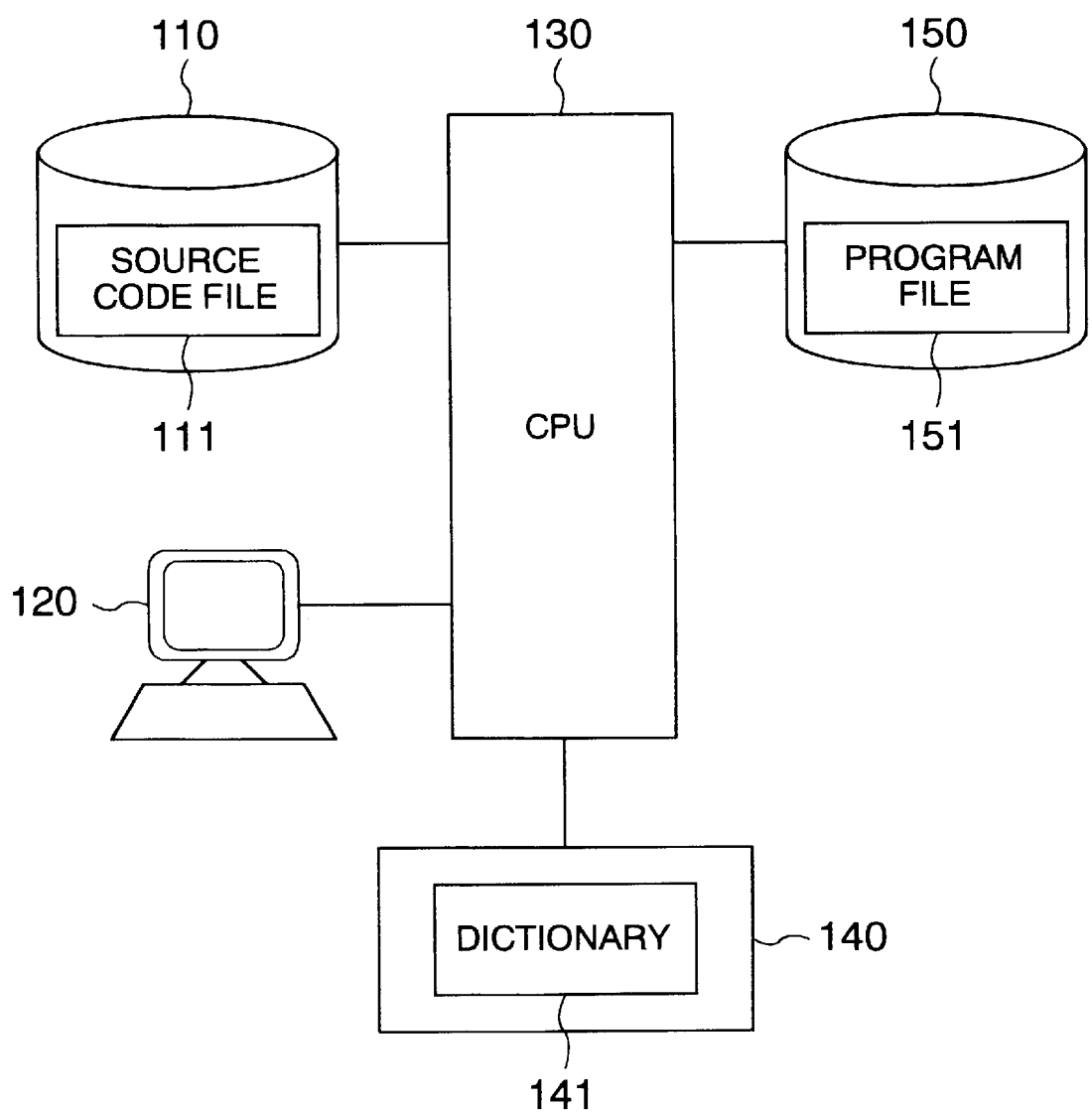
FIG. 1 is a schematic configuration diagram of a system representing one embodiment of the present invention.

FIG. 1 is a schematic configuration diagram of a system which realizes the present invention. In FIG. 1, numeral 110 designates a first external storage which stores a source code file (program component) 111 of already existing programs described in object oriented language. Numeral 120 designates an input-output device which is used by a component programmer (developer) or a programmer (component user), and it has a keyboard, a mouse, and a display. Numeral 130 designates a processing unit (CPU) which performs dictionary registration and program editing which will be described later. Numeral 140 designates a dictionary memory which stores a dictionary 141 containing interface information, interface body, and interface definition producing program which will be described later. Numeral 150 designates a second external storage which stores a program file 151 produced by a combination of components.

Figure 2:
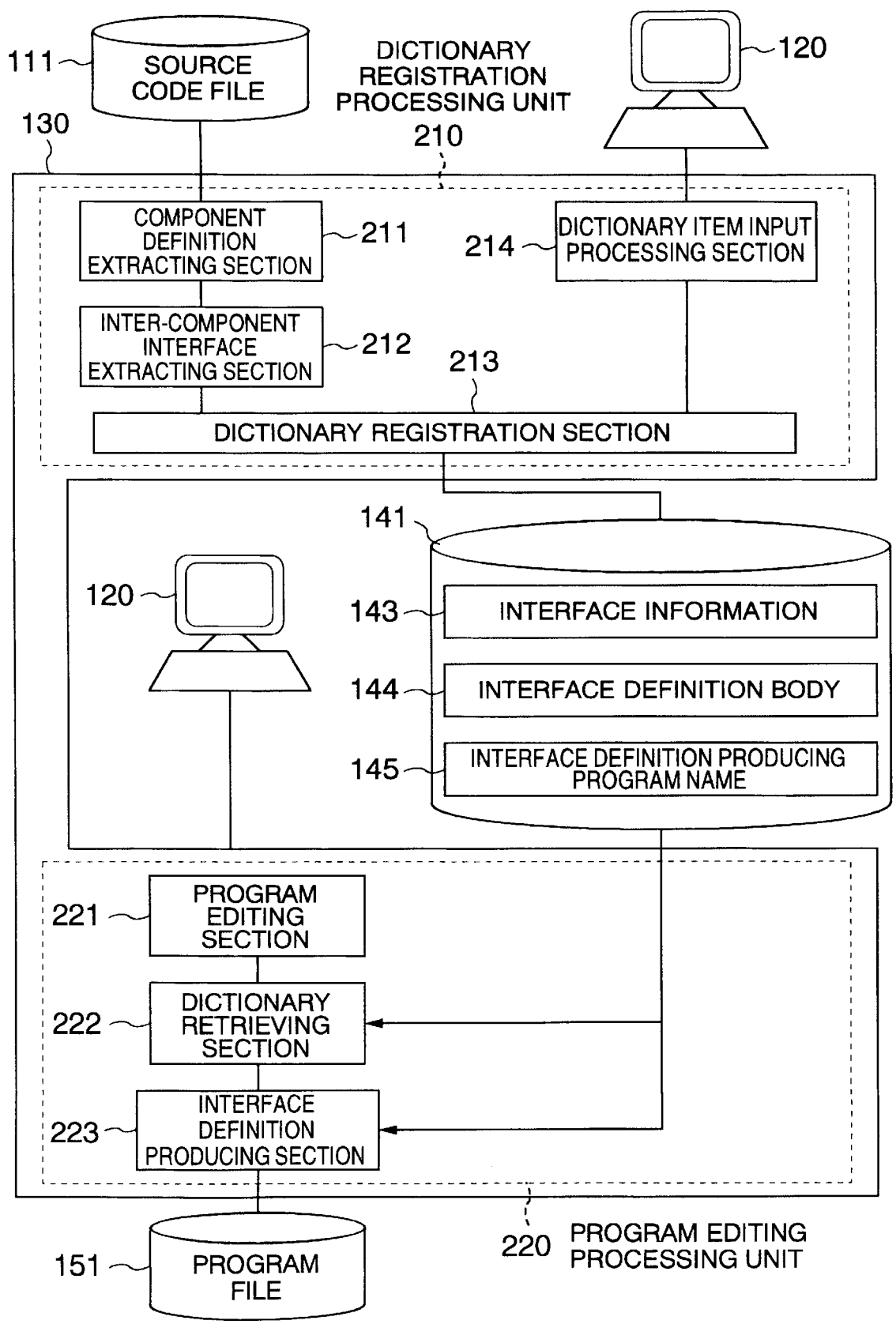
FIG. 2 is a functional block diagram of a system representing one embodiment of the present invention.

FIG. 2 shows a functional block diagram of the processing unit (CPU) 130. The processing mechanism of the CPU 130 is generally divided into a dictionary registration processing unit 210 and a program editing processing unit 220.

In the dictionary registration processing unit 210, a component definition extracting section 211 reads the source code file 111 of the programs described in the object oriented language, and analyzes and extracts component definition information. On the basis of the analyzed and extracted component definition information. an inter-component interface extracting section 212 extracts for each component, interface information including a counterpart component name, an interface name, and an interface definition, and a dictionary registration section 213 registers the interface information including the counterpart component name, interface name, and interface definition in the dictionary 141. On the other hand, when the existing programs are not described in the object oriented language, or there is no source code, a dictionary registration editor is invoked, and on the basis of an indication of a dictionary item input processing section 214, the developer of components inputs the component name, counterpart component name, interface name, and interface definition from the input-output device 120, and a dictionary registration section 213 registers the inputted information in the dictionary 141.

The interface information 143 such as component name, counterpart component name, and interface name, and a definition of interface itself (body) 144 may be produced by a program, and in this case, a program name 145 is stored in the dictionary 141.

The program editing unit 220 is operated when the user (programmer) of components uses the input-output device 120 and performs editing of a program. In a program editing section 221, during execution of editing of a program, when the user inputs a request for combination of components, in accordance with the request, a dictionary retrieving section 222 is made to execute. In the dictionary retrieving section 222, items of the inputted request for combination of components are analyzed, and based on this, the dictionary 141 is retrieved, and a list of items coincident with the request is displayed, and an specific interface is definitely decided on the basis of selection by the user with respect to the display. An interface definition producing section 223 reads the interface definition body 144 from the dictionary 141 based on the decided interface, or reads an interface definition producing program based on the program name 145, and an interface is produced. The produced program by the combination of components is stored in a program file 151.

Hereinafter, by way of a concrete example, the registration of components and the editing of a program will be described in detail.

Registration of Components

Figure 3:
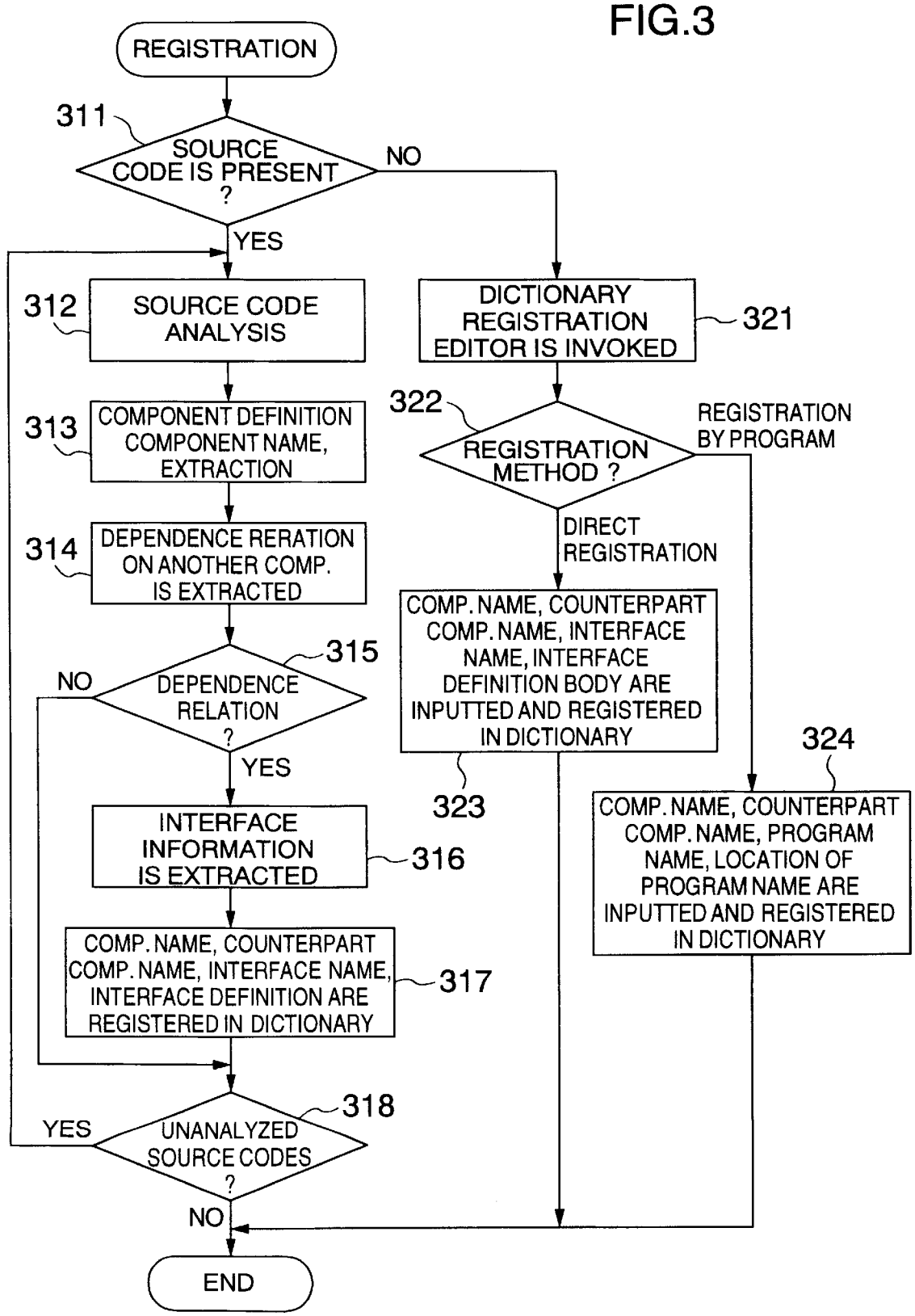
FIG. 3 is a processing flow chart of dictionary registration representing one embodiment of the present invention.

FIG. 3 is a processing flow chart of component registration, and it is worked when the purpose of utilization of the system is registration of components. The program which makes the CPU 130 execute this processing may be provided to the user in the form of a medium such as a disk and a ROM.

In FIG. 3, first, in step 311, it is decided whether or not source code described in the object oriented language are present. If not goes to step 321. If the source code are present, in step 312 the source code are analyzed, and in step 313 information of component definition and a component name is extracted, and in step 314 a dependence relation on another component is extracted from the information of component definition, and in step 315 the presence or absence of the dependence relation is decided. If there is no dependence relation, the decision in step 318 is performed. If the dependence relation is detected in step 315, in step 316 interface information (counterpart component name, interface name, interface definition) with a counterpart component is extracted, and in step 317 the component name, counterpart component name, interface name, and interface definition obtained in steps 313, 314, and 316 are registered in the dictionary, and goes to step 318. In step 318 it is decided whether or not all the analysis has been finished, and if not finished, returns to step 312 to continue the component registration, and if finished, the component registration processing of the present system is finished.

In FIGS. 5A to 5C, there is shown an example of the source code which are the object of the analysis in step 312. In FIGS. 5A to 5C, portions 51 (FIG. 5A), 52 (FIG. 5B), and 53 (FIG. 5C) enclosed by solid lines represent component definitions, and here, the definitions of three components; a Table, a Data Base (DB), and a Chart are respectively shown. Hereinafter, the contents of these definitions will be described based on the definition (51) of the "Table".

The component definition begins with a reserved word or a keyword (hereinafter, "keyword" represents a reserved word or keyword of a language) 'Class' (5101), and ends at a keyword 'End Class' (5111). The component name is a name (5102) which follows the keyword 'Class'. In step 313, the component definition and component name are extracted by cutting out the keywords 'Class' and 'End Class'. The head of the component definition defines a variable definition (5103) which is utilized by the whole component definition, and an attribute definition (5104) which defines attribute of the component. As in the definition (52) of the component "DB", there is a case where the variable definition and the attribute definition are lacking. Also in the definition (53) of the component "Chart", as the attribute of the chart, a color and area fill (531) are defined. Subsequent to the variable definition and the attribute definition, an interface definition (5106) is defined. The interface definition begins with a keyword 'Method' (5105), and ends at a keyword 'End Method' (5108). The interface name is a name (5107) which follows the keyword 'Method', and in the component "Table" in FIG. 5A, there are four interface names including 'Display_Table', 'Store_Table_in_DB', 'Display_Table_in_Bar Chart', and 'Display_Table_in_Broken_Line_Chart'. In step 314, the interface definition (5106) is analyzed, and the relation with another component is extracted. The interface with another component can be decided by 'Invoke' (5110) which is a syntax element of the language. In the example in FIG. 5A, the interface 'Display_Table' has no dependence relation on another component, and the other three interfaces have a dependence relation. The component name which has a dependence relation is a name (5109) which follows the 'Invoke'. In step 314, the interface definition (5106) is cut out, and by scanning its 'Invoke', it is possible to extract the presence or absence of the dependence relation. This presence or absence of the dependence relation is decided in step 315, and when the dependence relation is present, in step 316, it is scanned between the keywords 'Method' and 'End Method', and the counterpart component name (5109), interface name (5107), and interface definition (5106) are extracted.

In the processing described above, the component name, counterpart component name, interface name, and interface definition can be extracted, and in step 317, it becomes possible to register these in the dictionary. This processing is repeated until unanalyzed source codes are not present.

Figure 6:
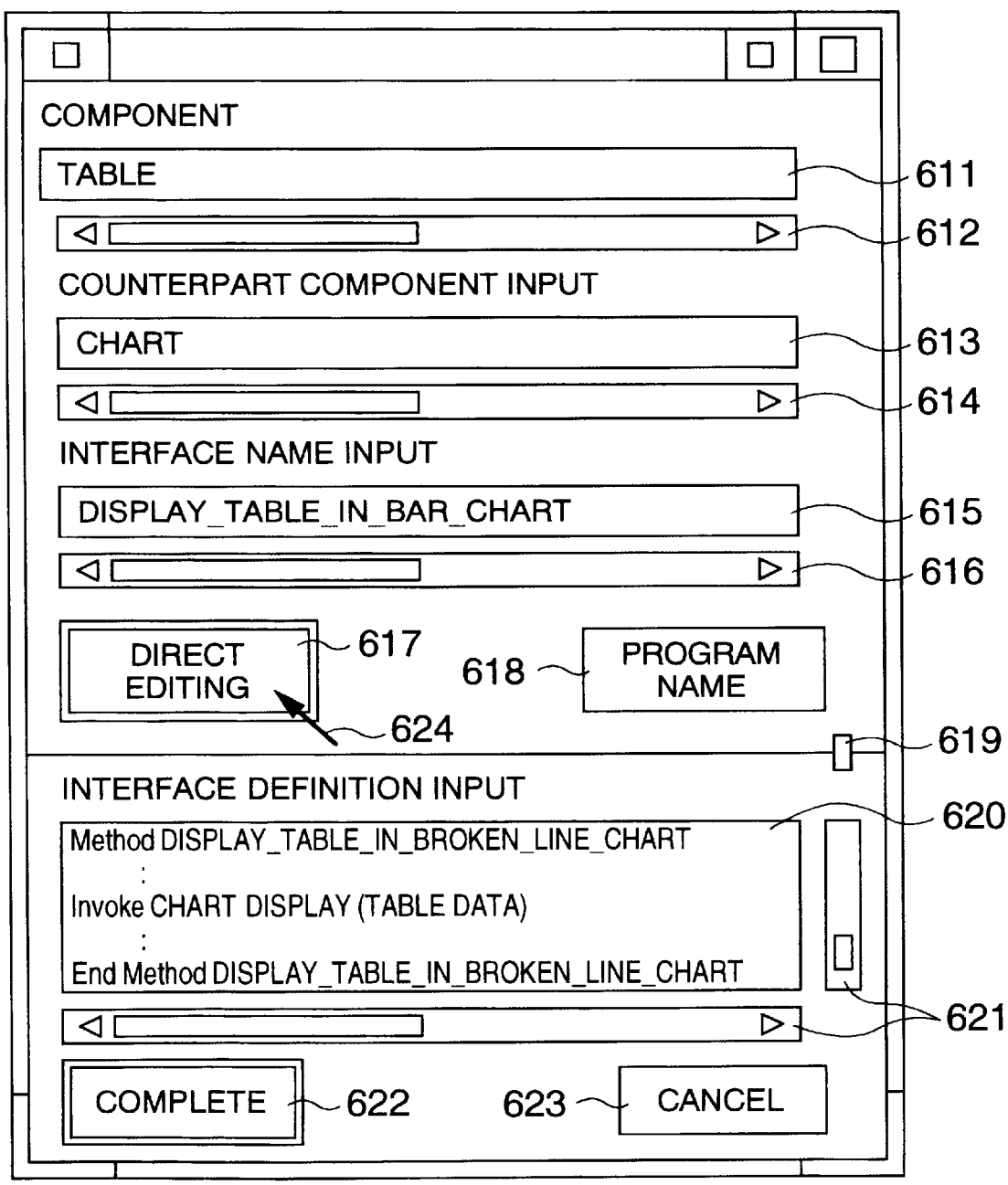
FIG. 6 is a diagram showing an example of a registration editor to a dictionary of the present invention.

On the other hand, in FIG. 3, in step 311, when there is no source code which is the object of the processing, in order to directly register information in the dictionary 141 by the component developer, the dictionary registration editor is invoked. An example of display of the dictionary registration editor is shown in FIG. 6. The dictionary registration editor has an area 611 for inputting a component name, an area 613 for inputting a counterpart component name, an are 615 for inputting an interface name, and an area 620 for inputting an interface definition. Buttons 617 and 618 are provided to select either the interface definition is inputted directly or the interface definition is produced by a program. When the button 618 is selected, the area 620 becomes an input area of the file name of a file in which a program is stored. In FIG. 6, the button 'direct editing' 617 is selected by a mouse 624 and in this example, the same contents as the interface 'Display_Table in Broken Line Chart' of the component "Table" (51) in FIG. 5A is inputted in the area 620. Buttons 622 and 623 select either to complete each registration or the registration is cancelled. Scroll bars 612, 614, 616, and 621 scroll respective areas to enable to view when inputted character strings are not accommodated in respective areas. Numeral 619 designates a button which is moved vertically so that the interface definition input area 620 is displayed enlarged or reduced. By inputting the component name, counterpart component name, interface name, and interface definition by the dictionary registration editor, the dictionary registration can be achieved.

Next, in FIG. 3, in step 322, it is decided whether the registration by the developer directly inputted the interface definition, or it was the interface definition by a program. When it was the registration by direct inputting, step 323 is executed, and the component name, counterpart component name, interface name, and interface definition are registered in the dictionary. Conversely, when it was the registration by the interface definition producing program, in step 324, the file name of a file which is the location at which the component name, counterpart component name, interface name, and interface definition are present is registered in the dictionary. In the example of display in FIG. 6, the step 323 in FIG. 3 is processed.

Figure 7:
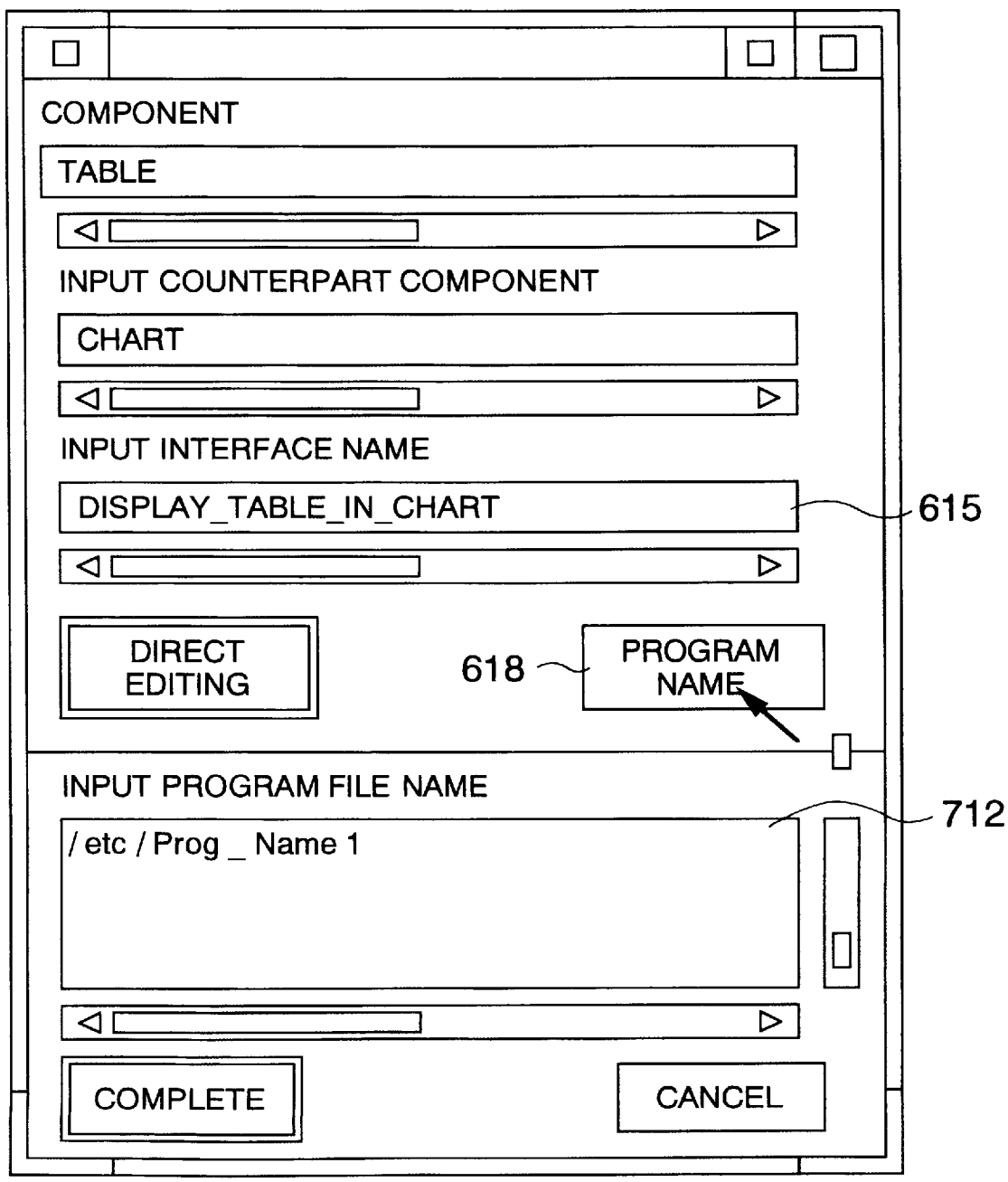
FIG. 7 is a diagram showing another example of a registration editor to a dictionary of the present invention.

FIG. 7 shows an example in which in FIG. 6, the button 'program name' (618) is selected. In this example, the area 620 is changed to an area 712, and '/etc/Prog_name1' is inputted which indicates the location at which the interface definition producing program is present. In this case, in FIG. 3, step 324 is executed.

Figure 8:
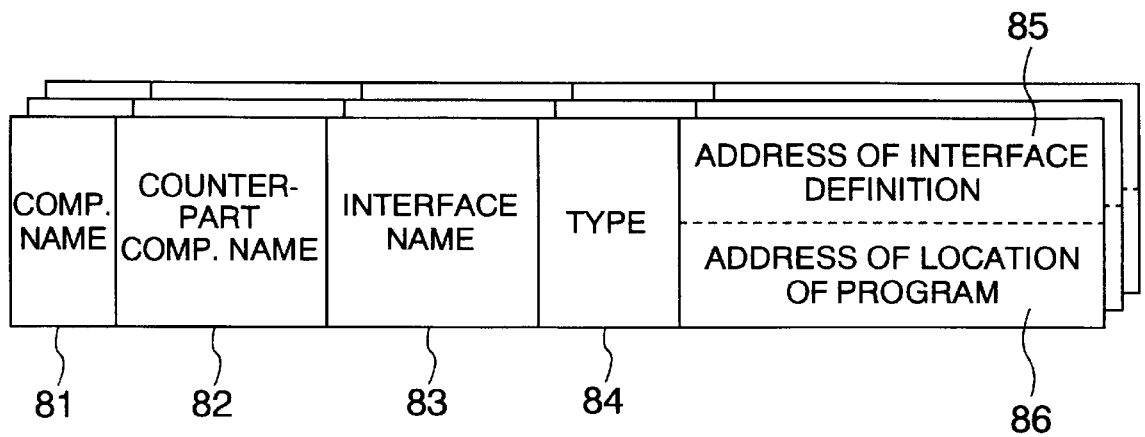
FIG. 8 is a diagram showing an example of configuration of a dictionary of the present invention.

FIG. 8 shows an example of configuration of the dictionary 141. In the dictionary 141, a plurality of items 81, 82, 83, 84, 85 and 86 constitute a single dictionary item, and these items are stored on a memory (dictionary memory 140). The items represent a component name (81), counterpart component name (82), interface name (83), location (address) of interface definition (85) or location (address) of interface definition producing program (86), and type (84). Here, the type, as shown in FIGS. 6 and 7, indicates whether it is the direct registration by the interface definition, or it is registered by inputting the location of the interface definition producing program. At item 85 or 86, there is stored an address on a memory at which the interface definition or the interface definition producing program is stored. The length of the interface definition is variable, and since the interface definition is impossible to be directly registered at the memory location of the item 85 or 86, it is stored at an address on the memory different from that of the dictionary items.

FIG. 9 shows, on the basis of the examples in FIGS. 6 and 7, how the dictionary items are stored in the dictionary. In this respect, the dotted lines indicate areas within the dictionary which are in a reference relation with the dictionary items, and areas (information stored at #xx, #yy, #zz, and #ww ) which are mutually in a reference relation are not required to be in a continuous area. In this example, the type 91 (84 in FIG. 8) is represented by "DD"(direct registration), and "P"(registration by the interface definition producing program). The item 92 is a dictionary item which defines the interface 'Display_Table_in_Broken_Line_Chart' in FIG. 5A. The method of registration of the interface definition is either the registration by step 317 in FIG. 3 or the registration by step 323 in FIG. 3 as shown in the example in FIG. 6, and here, since it is the direct registration by the interface definition, the type "D" is stored. The interface definition is stored at the address #zz on the memory. The item 94 represents an example in which it is indicated that the interface definition be produced by the program as shown in the example in FIG. 7, and this is the dictionary item registered in step 314 in FIG. 3. In this case, the type "P" is stored, and the interface definition itself is produced by a program having a program name '/etc/Prog_Name1' which is stored at the address #ww on the memory.

Program Editing

Figure 4:
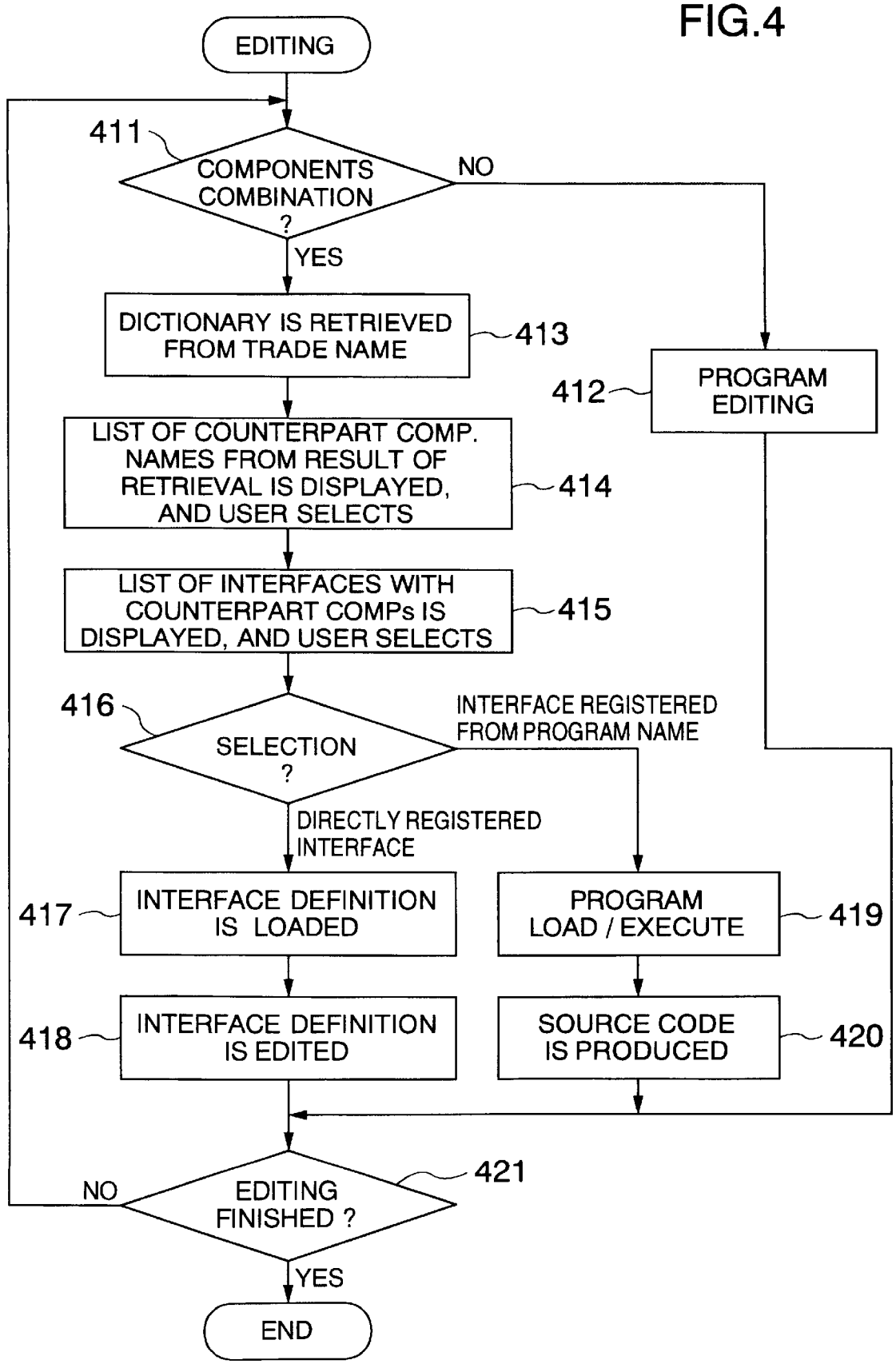
FIG. 4 is a processing flow chart of program editing representing one embodiment of the present invention.

FIG. 4 is a processing flow chart for program editing, and the operation is started when the purpose of utilizing the system is editing of a program. The program which makes the CPU 130 execute this processing may be supplied to the user in the form of a medium such as a disk and a ROM.

First, in step 411, on the basis of the indication by the user, in editing (preparing) a program, it is decided whether the program editing is performed by a normal text input, or the editing is performed by combining components. When it is judged that the editing is by the normal text input, in step 412 the user performs editing processing, and proceeds to decision step 421. On the other hand, when it is decided in step 411 that the program editing is performed by combining components, on the basis of a component name designated by the user, in step 413 the dictionary is retrieved, and in step 414 a list of retrieved counterpart component names is displayed, and makes the user select counterpart component names. Next, in step 415, from the counterpart component names selected by the user, a list of interface names of components and counterpart components is displayed, and makes the user select interface names. In step 416, the type (type 84 in FIG. 8) of interfaces selected by the user is judged, and in the case of directly registered interface, in step 417 an interface definition is loaded from the dictionary, and in step 418 the interface definition is edited, and proceeds to step 421. On the other hand, in step 416, when it is judged that a program name of interface definition producing program has been registered, from the dictionary, in step 419 the program is loaded to the memory, and the program is executed. As a result of the execution of the program, in step 420 a source code is produced, and proceeds to step 421. In step 421, it is decided based on an indication of the user whether or not the editing is finished, and if there is an indication of finish, the processing is finished, otherwise, returns to step 411 to continue the editing processing.

Figure 10:
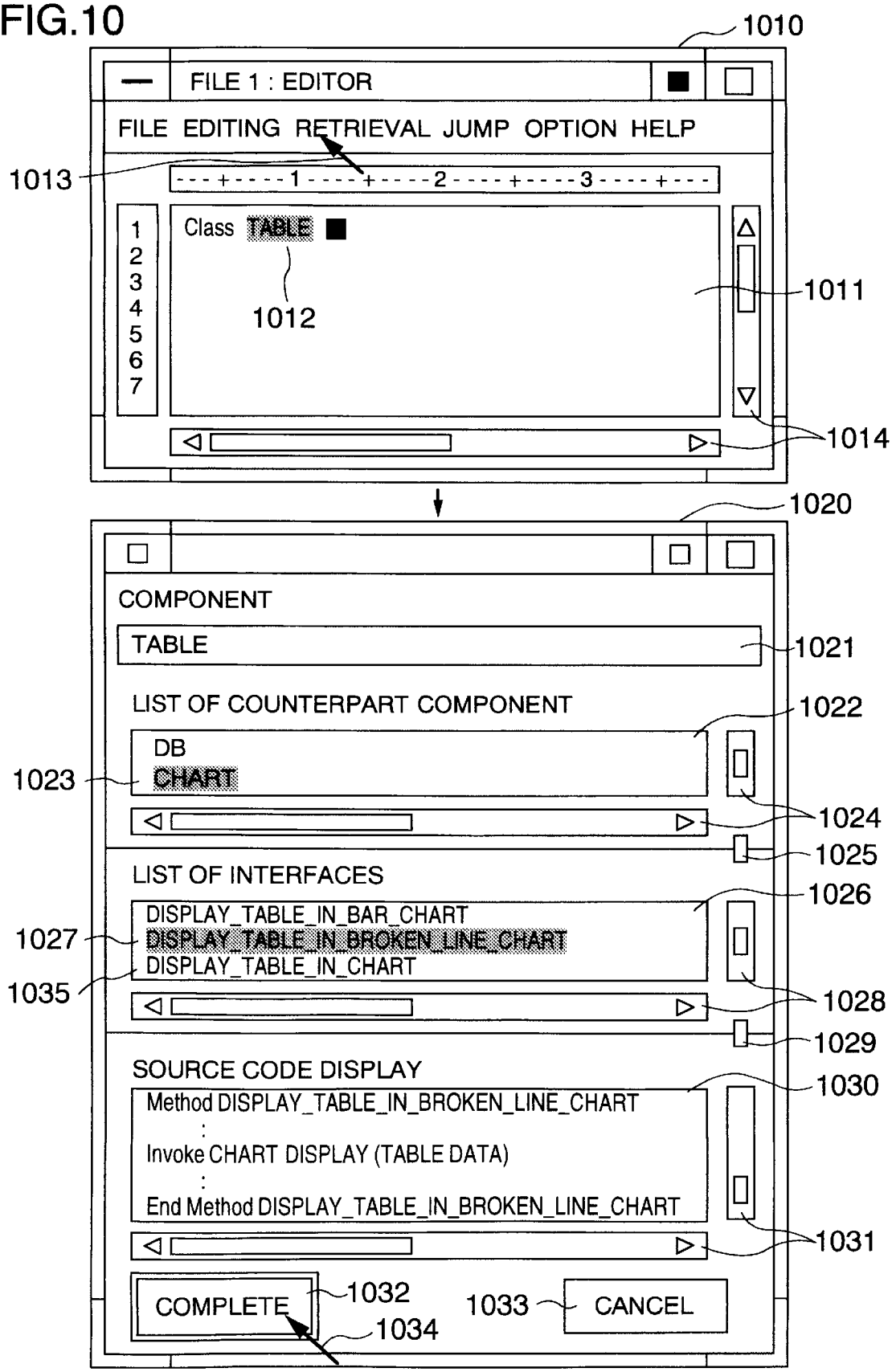
FIG. 10 is a diagram showing an example of a program editing editor of the present invention.

FIG. 10 shows an example of a program editor. A screen 1010 is an editing screen of the editor, and the numeral 1011 designates an input area of a text, the numeral 1014 designates scroll bars for scrolling the input area. Now the user intends to define a component "Table" anew, and in order to edit by combining and utilizing components from information already registered in the dictionary, a component name "Table" is inverse-selected (1012), and "retrieval" in the menu is clicked (1013) by a mouse. This is an indication by the user corresponding to step 411 in FIG. 4. On the basis of this indication, the system in FIG. 1 displays a screen 1020, and steps 413 to 420 are executed.

The screen 1020 is a screen for retrieving information of a combination of components. This example is based on the example of dictionary storing in FIG. 9. On an area 1021, there is displayed a component name "Table" selected on the screen 1010. On an area 1022, a list of counterpart component names related to the component "Table" is retrieved from the dictionary and displayed (steps 413 and 414). For example, since the user selected "Chart" as a counterpart for combination, the chart is inverse-displayed (1023). On an area 1026, there is displayed a list of interface names with the combination counterpart "Chart". Here, also, since the user selected the interface 'Display_Table_in_Broken_ Line_Chart', this portion is inverse-displayed (1027). By selecting an interface name, the interface definition of the interface name 'Display_Table_in_Broken_Line_Chart' is loaded from the dictionary, and displayed on an area 1030.

In this respect, numerals 1024, 1028, and 1031 designate scroll bars which scroll the areas, numerals 1025 and 1029 designate buttons which are movable up and down to adjust the size of the areas 1022 and 1026, numeral 1032 designates a button to finish the processing on the screen 1020, and numeral 1033 designates a button to cancel the processing on the screen 1020.

Figure 11:
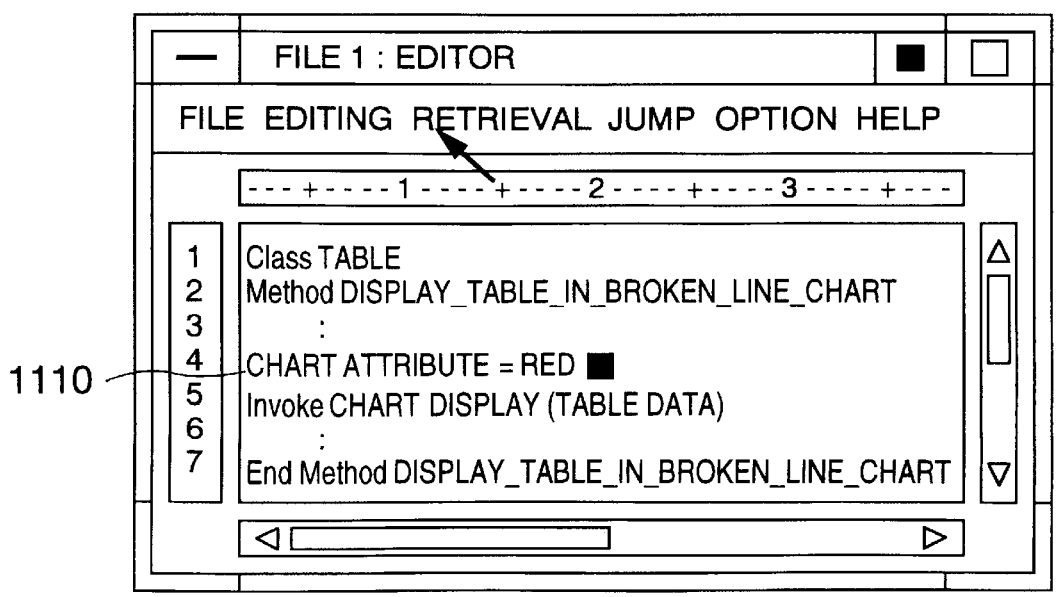
FIG. 11 is a diagram showing an example of program editing.

In FIG. 10, the user clicks (1034) the complete button 1032 by the mouse. As a result, the source code of the retrieved 'Display_Table_in_Broken_Line_Chart' is affixed to the text input area 1030 of the editor, and the user becomes possible to edit (step 418). FIG. 11 shows an example of editing using an input area 1110 (corresponding to input area 1011 in FIG. 10). In this example, the color attribute of the chart is changed to red.

Figure 12:
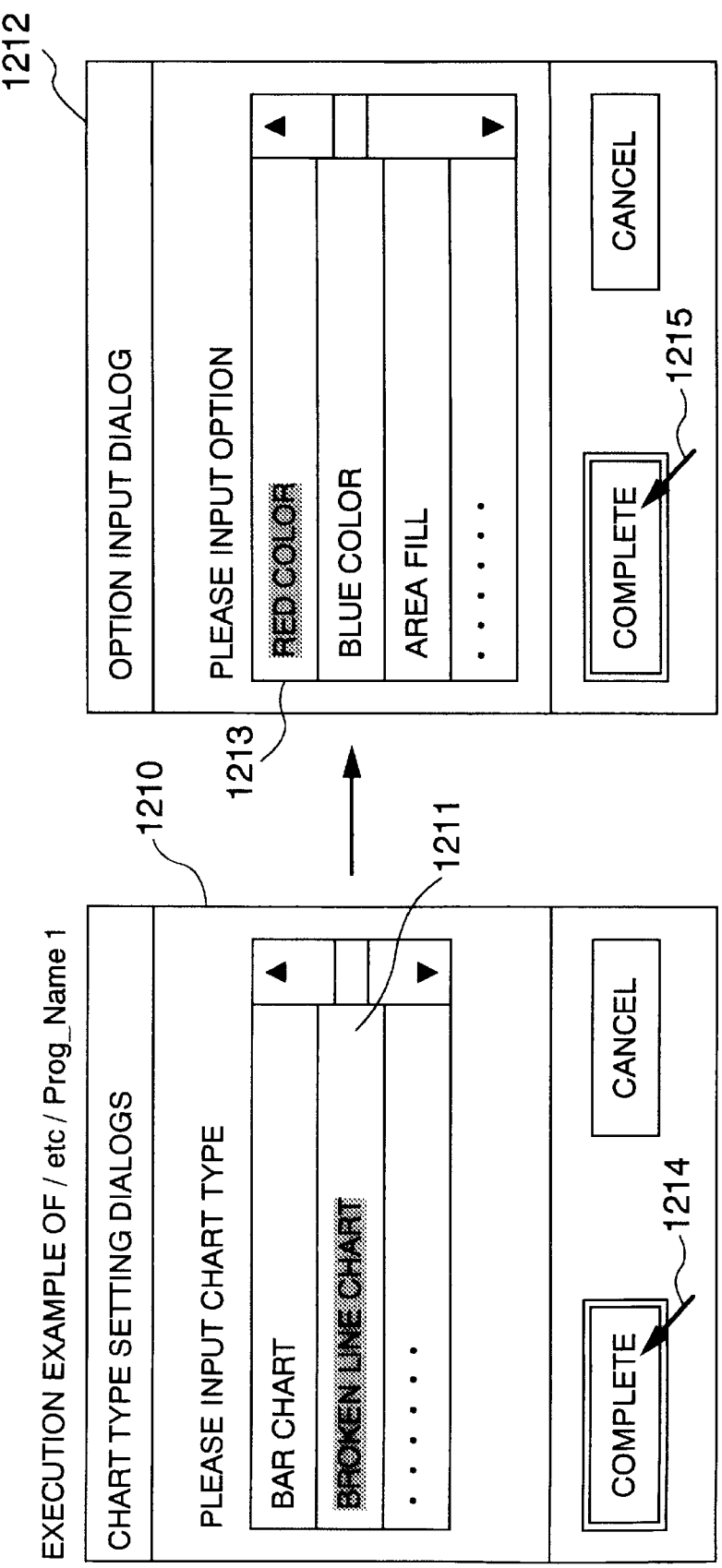
FIG. 12 is a diagram showing an example of operation of an interface definition producing program in one embodiment of the present invention.

On the other hand, when the user selects 'Display_ Table_in_Chart' (1035) in the interface name list 1026, on the basis of the dictionary in FIG. 9, and due to the decision 416 in FIG. 4, the interface definition producing program '/etc/Prog_Name1' is loaded/executed (step 419). FIG. 12 shows an example of program operation in the above-mentioned case, and FIG. 13 shows an example of program flow.

FIG. 12 shows screens 1210 and 1212 displayed by the program when the program '/etc/Prog_Name1' is executed. The user responds to such screens. In the screen 1210, the chart type is selected. In this example, since the broken line chart is selected, the display of this portion is reversed (1211), and the complete button is clicked (1214) by the mouse. Upon clicking, the screen 1212 is displayed, and a response to option attribute is inputted. In this example, since red color is selected, this portion is inversed (1213), and the complete button is clicked (1215). As a result of this response, the program produces the same source code as in FIG. 11.

Figure 13:
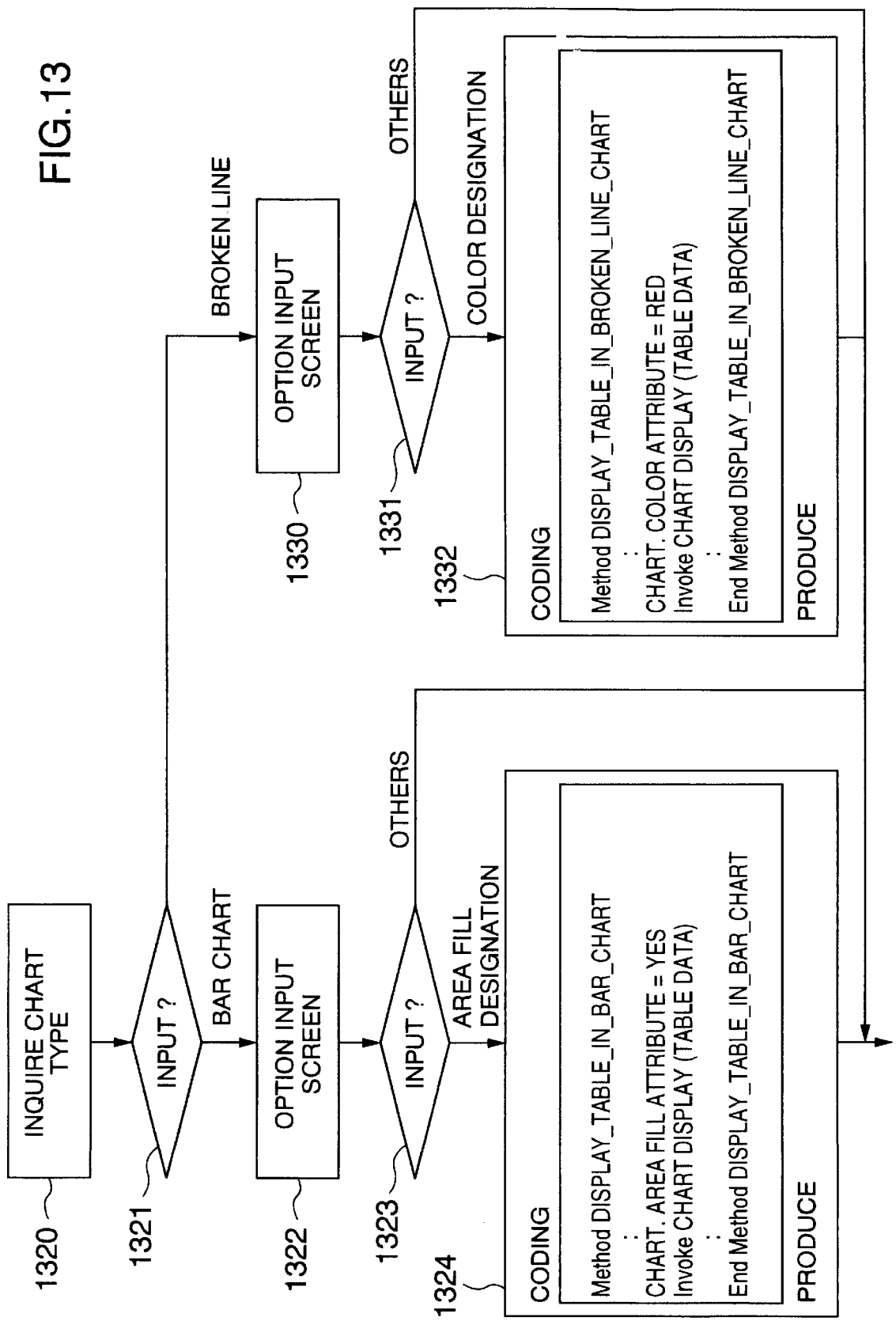
FIG. 13 is a flow chart showing an example of operation of an interface definition producing program in one embodiment of the present invention.

FIG. 13 is a schematic flow chart of the program of the operation described with respect to FIG. 12. In step 1320, the screen 1210 shown in FIG. 12 is displayed, and the decision 1321 is made based on the input by the user. As a result of the decision, when a broken line chart is designated, proceeds to step 1330, and the screen 1212 shown in FIG. 12 is displayed. The input by the user is judged 1331, and when red color is selected, a source code 1332 is produced. Depending on the decision in step 1321, step 1322, decision 1323, and source code 1324 are processed in a similar manner. As described above, by providing such an interface definition producing program in advance, the source code can be produced in step 420 in FIG. 4.

In the foregoing, an embodiment of the present invention is described. In the present invention, when the user indicates a combination of components, a list of interface information between the components, which has been extracted or defined in advance, is displayed, and by selecting and indicating the interface information by the user, it is possible to retrieve or produce a program which realizes the combination.

We claim:

1. A method of preparing a new program by combining program modules (hereinafter, referred to as components) on a computer, said method comprising the steps of:

automatically extracting by said computer a class definition expressing a component in object oriented language, from a source code of an already existing program;

automatically extracting by said computer a dependence relation of the component with another component, from a method (hereinafter, referred to as interface) definition within the class definition;

holding in a dictionary a component name, a counterpart component name, an interface name with a counterpart component, and an interface definition as interface information;

wherein, when a user prepares the new program by combining a component with another component, retrieving from the dictionary a list of interface information between the components, on the basis of designation by the user as to the components desired to be combined, and displaying the list on a display device; and in response to designation by the user as to specific interface information from the list, extracting by said computer an interface definition from said dictionary on the basis of the specific interface information, and producing said new program on the basis of the extracted interface definition.

2. A method of preparing a new program according to claim 1, wherein in the case of adding intercomponent interface information, or the components are not programed in the object oriented language, interface information defined by a developer is registered in the dictionary by said computer.

3. A method of preparing a new program according to claim 2, wherein a source code of the interface definition is automatically produced by executing a program for preparing the interface definition by said computer.

4. An apparatus for assisting program preparation comprising:

a first external storage for storing an already existing program described in object oriented language;

a dictionary memory for storing interface information between two program modules (hereinafter, referred to as "components");

a second external storage for storing a new program prepared by a user;

an input-output device manipulated by said user; and a processing unit connected to said first and second external storages, said dictionary memory, and said input-output device;

said processing unit including:

means for extracting component names and their definition information from said already existing program by using a specific keyword defined in said object oriented language as a key;

means for extracting, for each of the extracted component names and from its definition information, interface information including a counterpart component name and an interface definition with the counterpart component;

means for registering, for each of the extracted component names, said interface information in said dictionary;

means, in response to a component name inputted by said user through said input-output device, for retrieving said dictionary memory, and for displaying interface information related to said inputted component name on said input-output device; and means, on the basis of display on said input-output device, for inserting said displayed interface information into said new program in response to an indication inputted by said user, thereby to prepare said new program.

5. A method of assisting program preparation by using an apparatus, said apparatus including:

a first external storage for storing an already existing program described in object oriented language;

a dictionary memory for storing interface information between two program modules (hereinafter, referred to as "components");

a second external storage for storing a new program prepared by a user;

an input-output device manipulated by said user; and a processing unit connected to said first and second external storages, said dictionary memory, and said input-output device;

said method comprising the steps of:

extracting, by said processing unit, component names and their definition information from said already existing program by using a specific keyword defined in said object oriented language as a key;

extracting, by said processing unit, for each of the extracted component names and from its definition information, interface information including a counterpart component name and an interface definition with the counterpart component;

registering, by said processing unit, for each of the extracted component names, said interface information in said dictionary;

in response to a component name inputted by said user through said input-output device, retrieving, by said processing unit, said dictionary memory, and displaying interface information related to said inputted component name on said input-output device; and on the basis of display on said input-output device, inserting said displayed interface information into said new program in response to an indication inputted by said user.

6. A medium for use in a program preparation assisting apparatus, said apparatus comprising:

a first external storage for storing an already existing program described in an object oriented language;

a dictionary memory for storing interface information between two components;

a second external storage for storing a new program prepared by a user;

an input-output device manipulated by said user; and a processing unit connected to said first and second external storages, said dictionary memory, and said input-output device, said medium comprising:

means for causing said processing unit to extracting component names and their definition information from said already existing program by using a specific keyword defined in said object oriented language as a key;

means for causing said processing unit to extract, for each of the extracted component names and from its definition information, interface information including a counterpart component name and an interface definition with the counterpart component;

means for causing said processing unit to register, for each of the extracted component names, said interface information in said dictionary;

means, in response to a component name inputted by said user through said input-output device, for causing said processing unit to retrieve said dictionary memory, and to display interface information related to said inputted component name on said input-output device; and means, on the basis of display on said input-output device, for causing said processing unit to insert said displayed interface information into said new program in response to an indication inputted by said user.

* * * * *